(12) United States Patent
Misra et al.

(10) Patent No.: US 7,707,101 B2
(45) Date of Patent: Apr. 27, 2010

(54) LOAN OPTION MODEL

(75) Inventors: Ashish Misra, New York, NY (US);
Zhifeng Zhang, Cranbury, NJ (US);
Andrew Todd Ulmer, Princeton, NJ
(US); Frank S. Accetta, Shady, NY
(US)

(73) Assignee: Morgan Stanley, New York, NY (US)

( * ) Notice: Subject to any disclaimer, the term of this patent is extended or adjusted under 35 U.S.C. 154(b) by 956 days.

(21) Appl. No.: 10/864,623

(22) Filed: Jun. 9, 2004

(65) Prior Publication Data

US 2005/0144117 A1 Jun. 30, 2005

Related U.S. Application Data

(60) Provisional application No. 60/526,922, filed on Dec. 4, 2003.

(51) Int. Cl.
*G06Q 40/00* (2006.01)
(52) U.S. Cl. .............................. 705/38; 705/35; 705/39
(58) Field of Classification Search .................. 705/38, 705/37; 706/61; 725/10
See application file for complete search history.

(56) References Cited

U.S. PATENT DOCUMENTS

2003/0101449 A1* 5/2003 Bentolila et al. .............. 725/10
2003/0115128 A1* 6/2003 Lange et al. .................. 705/37
2003/0135450 A1* 7/2003 Aguais et al. ................. 705/38
2004/0054620 A1* 3/2004 Bykhovsky .................. 705/38
2004/0153430 A1* 8/2004 Sayad ......................... 706/61

OTHER PUBLICATIONS

Belkin et al., "Credit Risk Premiums in Commercial Lending", p. 2.*
Clark Jeffries, "Code Recognition with Neural Network Dynamical System", Dec. 1990, SIAM Review, vol. 32, p. 636-637.*
Barry Belkin, Lawrence R. Forest, Jr., Scott D. Aguais, and Stephet Suchower. "Credit Risk Premiums in Commercial Lending" appeared as "Expect the unexpected" in Risk, Nov. 1998.*
Clark Jefffries, Code Recognition with Neural Network Dynamical System SIAM Review, vol. 32, No. 4, pp. 636-651, Dev. 1990.*
Pamela Nickell, William Perraudin, and Simone Varotto, Stability of Ratings Transitions, Bank of England 2001, ISSN 1368-5562.*
Wikipedia.com, Finite State Machine.*
SearchCIO-Midmarket.com, M. Kicklighter.*

* cited by examiner

*Primary Examiner*—Hani Kazimi
*Assistant Examiner*—Hao Fu
(74) *Attorney, Agent, or Firm*—K&L Gates LLP (57) ABSTRACT

Systems and techniques for operating on data to value an instrument include representing an account include accessing a transition matrix including probabilities for a borrower transitioning from one credit rating to another; determining for each credit rating whether a borrower will stand or exercise a loan option; valuing the loan option; and determining a present value of the instrument.

25 Claims, 4 Drawing Sheets

LOAN OPTION MODEL

This application claims the priority benefit of U.S. Provisional Application No. 60/526,922 which was filed on Dec. 4, 2003, and is incorporated by reference in its entirety.

TECHNICAL FIELD

The present invention relates generally to systems and methods for analyzing and reporting data and, more particularly, to systems and methods for operating on data representing various parameters of a loan option model.

BACKGROUND

Historically, there has been limited cross-product trading of credit assets such as bank loans, credit insurance and credit re-insurance, credit derivatives, industrial bonds, and convertible bonds. With the growth of credit derivatives, a legal structure has evolved enabling credit trading across asset classes.

Determining the value of a credit asset is a necessary component of trading but has been a somewhat inexact process. Because the market for credit assets is not very liquid, it is not possible to quickly ascertain the market value of a particular credit asset on a given day. Further complicating valuation are options to draw, prepay, and term-out (i.e., renew) which may be included in the terms of the loan contract. The fact that such options are recurring during the life of the loan and that borrowers seldom exercise such options in an optimal way, makes attributing a value to an option difficult.

One conventional approach for loan valuation uses a hazard rate model. This model captures the expected draw by way of a pre-calculated parameter, which is a function of the credit rating at value date.

According to the hazard rate model, the funded portion of the loan is modeled as a bond, and the unfunded portion is modeled as a modified default swap. The funded cash flow structure is identical to a bond with notional of funded amount plus the additional draw. The unfunded part is equivalent to a default swap with the reference price set at draw rate at default with notional set to be the unfunded amount less the additional draw. Consequently, the present value of the loan is the sum of the present value of the bond and that of the default swap.

Thus, the present value of the funded part is:

$$PV_b = F_a \left[ \sum_{i=1}^{N} B(t_i)P(t_i)C_i \Delta t_i + B(t_N)P(t_N) \right] \div$$

$$R_L F_a \left[ \sum_{i=1}^{N} B(t_i)|P(t_{i-1}) - P(t_i)| \right] - \alpha_s U$$

where
$\{t_i\}_i^N = 0$—cash flow date for $i \geq 1$, $t_0$ is the value date and $t_N$ is in the maturity of the loan.
$\{C_i\}_i^N = 1$—coupon at cash flow date $t_i$.
$B(t)$—the discount function at time t.
$P(t)$—the survival probability at time t.
$R_L$—loan recovery rate.
$F_a$—adjusted funded amount.
$\alpha_s$—expected (scaled) draw rate.
$F$—current funded amount.

The coupon $C_i$ is given by $$C_i = r_i + f_i + u_i + s_i$$

where $r_i$, $f_i$, $u_i$ and $s_i$ are the LIBOR rate, facility fee, utilization fee and spread paid at $t_i$ respectively.

The adjusted funded amount is given by $$Fa = F + \alpha_s U$$

The present value of the default swap is given by, $$PV_d = U_a \sum_{i=1}^{K} B(t_i)P(t_i)c_i \Delta t_i - \alpha_D(1 - R_L)U_a \left[ \sum_{i=1}^{N} B(t_i) [P(t_{i-1}) - P(t_i)] \right]$$

where
$\alpha_D$—the draw rate at default.
$\{c_i\}$—premium cash flow at time $t_i$, this is computed as $$c_i = f_i + o_i$$

where $f_i$ and $o_i$ are the facility fee and commitment fee paid at time $t_i$.
$U_a$—adjusted unfunded amount and is computed as $$U_a = U - \alpha_s U.$$

The hazard rate model approach determines the draw independent of the current spread and time to maturity. Loans with a term-out option are valued by extending the maturity of the loan using a pre-calculated lookup table obtained from historical data. Furthermore, this approach does address the timing and amount of draw and prepayment options.

Because the value of an option depends on various parameters such as intrinsic value (in, at, out-of-the money), time to maturity, volatility, spread levels, fees, and other miscellaneous indicatives in the loan contract, system and techniques are needed which capture such dependencies, correctly address draw and prepayment options, and better construe term-out options.

SUMMARY

In one general aspect, systems and techniques for operating on data to value an instrument include representing an account include accessing a transition matrix including probabilities for a borrower transitioning from one credit rating to another; determining for each credit rating whether a borrower will stand or exercise a loan option; valuing the loan option; and determining a present value of the instrument.

Aspects of the present invention may be implemented by a computer system and/or by a computer program stored on a computer readable medium. The computer readable medium may comprise a disk, a device, and/or a propagated signal.

Other features and advantages will be apparent from the following description, including the drawings, and from the claims.

DESCRIPTION OF THE FIGURES

FIGS. 5 and 6 illustrate a graphical user interfaces according to one embodiment of the present invention.

DETAILED DESCRIPTION

The present invention is directed to systems and methods for organizing and operating on data representing parameters of a loan option model. For simplicity, the basic components of such systems and methods are provided. However, as would be understood by one of ordinary skill in the art, the systems and methods described below may include various other structures and/or processes in actual implementation.

In one implementation, loans are classified into four categories, namely, Commercial Paper (CP) backstops, Term-Loans, Revolvers, and CP backstops with term-out options. Each category may include options that are enforced and applicable ramp functions.

Loans are seldom exercised optimally. As such, the ramp functions enforce "intelligence" on top of the model decision-making process to account for sub-optimal exercise of options.

CP backstops are fully unfunded loans, which include an option to draw but do not include an option to prepay. In one implementation, the loan option model assumes that a draw occurs at lower of BB+ and a three ratings downgrade.

Term-Loans are fully funded loans, which include an option to prepay but do not include an option to draw. In one implementation, the loan option model assumes that a prepayment occurs at an upgrade of two ratings or more.

Revolvers are the most generic of all loans and include both an option to draw and an option to prepay. In one implementation, the loan option model assumes that a draw occurs at a downgrade of two ratings and below, and prepayment occurs at an upgrade of two ratings or more.

CP backstops with term-out options are loans with an extension option at expiration where full draw is enforced. For example, a one-year loan with a one-year term out option allows a borrower, at the one-year maturity date, to fully draw on the loan and extend its maturity by an additional year. In one implementation, the loan option model assumes that at intermediate times, the draw rates are those set on the CPs and that full draw occurs at maturity at lower of B and two rating downgrade.

In one embodiment, the parameters for the loan option model are obtained from historical behavior of loan draws and prepayment. Rating upgrades and downgrades may be measured from the issue date and/or the value date. It is noted that parameterization of the ramp function may result in low-rated CPs not drawing and high-rated term-loans and revolvers not prepaying.

In general, the value of a loan option depends on various parameters such as its intrinsic value (in, at, out-of-the money), time to maturity, volatility, spread levels, fees, and other miscellaneous indicatives in the loan contract. The loan option model is configured to capture such dependencies. The loan option model also is designed to value loans having options to term-out, cancel, draw and/or prepay.

In one embodiment, the loan option model algorithm includes a backward induction approach and loan pricing. Terminal conditions of the loan option model may be modified for term-out options. Model parameters may include draw at default rate, draw prior to default rate, prepay rate, etc. The loan option model is designed to capture a refinancing or cancellation option.

In some cases, the fees and spread may be assumed constant at every cash flow date and are set to their levels obtained at value date. The loan option model is configured to incorporate a rating dependent fee/spread structure.

In one implementation, a rating migration model constructs a Markov chain for the rating change dynamics. Risk neutral migration probabilities are obtained from either the default swap market for investment grade names or the bond market for high yield names. A detailed discussion on the estimation of the generator of the Markov chain and its calibration to market quotes is discussed below.

Estimation of the Generator of the Credit Transition Probability Matrix

Consider a continuous time Markov chain $\overline{X}(t)(t>0)$ with stationary transition probabilities and a finite state space S. Let $P_{ij}(t)$ be the transition probability from state i to j in time t. Then $P_{ij}(t)$ satisfies $$P_{ij}(t) \geq 0$$

$$\sum_{j=1}^{N} P_{ij}(t) = 1$$

$$P_{ik}(t+s) = \sum_{j=1}^{N} P_{ij}(t) P_{jk}(s)$$

It may be shown that the transition probability matrix may be written as $$P(t) = e^{\Lambda t},$$

with P(0)=I. Here $\Lambda$ is the generator matrix defined as $$\Lambda = \begin{pmatrix} \lambda_1 & \lambda_{12} & \cdots & \lambda_{1N} \\ \lambda_{21} & \lambda_2 & \cdots & \lambda_{2N} \\ \vdots & \vdots & \ddots & \vdots \\ \lambda_{N1} & \lambda_{N2} & \cdots & \lambda_N \end{pmatrix}$$

with, $$\lambda_i = -\lim_{h \to 0+} \frac{1 - P_{ii}(h)}{h}$$

$$\lambda_{ij} = -\lim_{h \to 0+} \frac{P_{ij}(h)}{h}, i \neq j.$$

Using equation A.1, one can show that $$\lambda_i = -\sum_{j=1, j \neq i}^{N} \lambda_{ij}.$$

A maximum likelihood estimator of $\Lambda$ is derived assuming observance of all the transitions of an i.i.d. sample of X(t) over a finite time horizon [0,T]. If N i.i.d. samples of X(t) are observed, they can be denoted by $X = \{X_i(t); t \in [0,T], i \in [1,N]\}$. Let $n_i(T)$ be the number of transitions observed for $X_i(t)$ during [0,T]. Let $T_{ij}$ denote the $j^{th}$ transition time of $X_i$. $s_i(t) \in S$ can be denoted as the state of $X_i$ at time $t \in [0,T]$.

Let $L_i(\Lambda; X_i)$ be the likelihood function of $\Lambda$ corresponding to the trajectory $X_i$. Using equations A.2, A.3, and A.4, it can be shown that the likelihood function is given by, $$L_i(\Lambda; X_i) = e^{\lambda_{s_i(T_{i,n_i(T)})}(T-T_{i,n_i(T)})} \prod_{j=1}^{n_i(T)} \lambda_{s_i(T_{i,j-1})s_i(T_{i,j})} e^{\lambda_{s_i(T_{i,j-1})}(T_{i,j}-T_{i,j-1})}$$

$L_i(\Lambda; X_i)$ represents the probability density of $n_i(T)$ transitions for the trajectory $X_i$. Since all samples are independent the following can be written:

$$L(\Lambda; X) = \prod_{i=1}^{N} L_i(\Lambda; X_i)$$

where, $L(\Lambda; X)$ represents the likelihood function of $\Lambda$ corresponding to all samples. The log-likelihood function of $\Lambda$ is defined as:

$$l(\Lambda; X) \equiv \ln L(\Lambda; X)$$
$$= \sum_{i=1}^{N} \Bigg( \lambda_{s_i(T_{i,n_i(T)})}(T - T_{i,n_i(T)}) +$$
$$= \sum_{j=1}^{n_i(T)} \lambda_{s_i(T_{i,j-1})}(T_{i,j} - T_{i,j-1}) + \ln \lambda_{s_i(T_{i,j-1})s_i(T_{i,j})} \Bigg)$$

To maximize the likelihood estimator with respect to $\lambda_{lm} \forall l \neq m$, using the relation $$\lambda_i = -\sum_{j=1, j \neq i}^{N} \lambda_{ij},$$

the above equation can be differentiated to obtain, $$\frac{\partial l(\Lambda; X)}{\partial \lambda_{lm}} = -\sum_{i=1}^{N} \Bigg( (T - T_{i,n_i(T)}) 1_{s_i(T_{i,n_i(T)})=l} +$$
$$\sum_{j=1}^{n_i(T)} (T_{i,j} - T_{i,j-1}) 1_{s_i(T_{i,j-1})=l} \Bigg) +$$
$$\frac{1}{\lambda_{lm}} \sum_{i=1}^{N} \sum_{j=1}^{n_i(T)} 1_{\{s_i(T_{i,j-1})=l, s_i(T_{i,j})=m\}}$$
$$= -\int_0^T N_l(t)dt + \frac{1}{\lambda_{lm}} N_{lm}(t)$$

where, $N_l(t)$, is the number of samples in state l at time t and, $N_{lm}(t)$, is the number of transitions from state l to m in [0,T]. If $$N_{lm}(t) = 0, \frac{\partial l(\Lambda; X)}{\partial \lambda_{lm}} < 0,$$

in which case $\lambda_{lm}=0$. In the event $$N_{lm}(t) > 0, \frac{\partial^2 l(\Lambda; X)}{\partial \lambda_{lm}^2} = -\lambda_{lm}^{-2} N_{lm}(t) < 0,$$

and, $$\lambda_{lm}^{MLE} = \frac{N_{lm}}{\int_0^T N_l(t)dt}$$

Calibrating the Markov Chain

Let $\{(t_i, c_i, p_i)\}_{i=1}^{M}$ be the credit curve, where $t_i$, $c_i$ and $p_i$ are the maturity, coupon, and price respectively in the $i^{th}$ point of the curve. In the case of bond credit curve, $c_i$ is the par coupon and $p_i=1$. In the case of default swap curve, $c_i$ is the default swap premium and $p_i=0$. A piecewise constant risk premium function $h(t)$, i.e., $h(t)=h_i$, for $t_{i-1} \leq t \leq t_i$ is used. The goal is to compute $h_i$ for $i=1, \ldots, M$. Let $PV_i$ be the present value of the $i^{th}$ point based on the model, then $PV_i$ is the function of $R_b$ and $h_1$, $h_i$, i.e.

$$PV_i = PV_i(h_1, \ldots, h_i; R_b)$$

For the loan model it is assumed that the individual company's generator adopts the following form:

$$\Lambda_t = \sum_{i=1}^{K} 1_{\{t_{i-1} \leq t \leq t_i\}} h_i \Lambda$$

where the $h_i$'s are calculated from the calibration procedure discussed above and are piecewise constant. The transition probability matrix is thus given by the modified expression $$P(t,T) = e^{\Lambda \int_t^T h(s)ds}$$

Since we calibrate the model to the credit curve, the following calibration system results:

$$\begin{cases} PV_1(h_1; R_b) &= p_1 \\ PV_2(h_1, h_2; R_b) &= p_2 \\ \ldots & \ldots \ldots \\ PV_M(h_1, h_2, \cdots, h_M; R_b) &= p_M \end{cases}$$

Bootstrapping Method

This system can be solved by the bootstrap method: Namely, solve $h_1$ from the first equation, substitute $h_1$ into the second equation to solve for $h_2$, and so on. In general for the $i^{th}$ equation, $h_1, \ldots, h_{i-1}$ has already been solved from the previous i−1 equations, substituting these known values into the equation, solve for $h_i$ by using any non-linear root finder. In one case, the secant root finding method is used.

Bond Pricing Function
Let k be the initialial credit for the credit curve.

$$PV_i(h_1, \cdots, h_{i-1}, h_i; R_b) =$$
$$\sum_{i=1}^{N} B(t_i)P(t_i)c_i \Delta t_i + B(t_N)P(t_N) + R_b \sum_{i=1}^{N} B(t_i)[P(t_{i-1}) - P(t_i)]$$

where $$P(t_i) = \exp\left[-\left(\sum_{j=1}^{i} h_j \Delta t_j\right) \Lambda \right] e_k.$$

Default Swap Pricing Function $$PV_i(h_1, \cdots, h_{i-1}, h_i; R_b) =$$
$$\sum_{i=1}^{N} B(t_i)P(t_i)c_i \Delta t_i - (1 - R_b) \sum_{i=1}^{N} B(t_i)[P(t_{i-1}) - P(t_i)]$$

Fast Algorithm for Matrix Exponential

Consider the generator matrix computed in the earlier section. It is desired to evaluate the matrix $$\exp(\Lambda t) = I + \sum_{i=0}^{\infty} \frac{\Lambda^n t^n}{n!}$$

with $\Lambda$ the generator, having the special form (since the last state is absorbing)

$$\Lambda = \begin{bmatrix} A & b \\ 0 & 0 \end{bmatrix}$$

where the matrix A is assumed to be diagonalizable and b is a column vector in $\mathbb{R}^n$. Substituting into equation yields, $$\exp(\Lambda t) = I + \sum_{i=0}^{\infty} \begin{bmatrix} \frac{A^n t^n}{n!} & \frac{A^{n-1} b t^n}{n!} \\ 0 & 0 \end{bmatrix} = \begin{bmatrix} e^{\Lambda t} & (e^{\Lambda t} - I)A^{-1}b \\ 0 & 0 \end{bmatrix}$$

Since A is assumed to be diagonalizable, it may be written in the form $A = VDV^{-1}$, where V is the matrix of eigenvectors and D is a diagonal matrix of eigenvalues. Thus equation reduces to $$\exp(\Lambda t) = \begin{bmatrix} Ve^{Di}V^{-1} & (Ve^{Di}V^{-1} - I)A^{-1}b \\ 0 & 0 \end{bmatrix}$$

The matrix $A^{-1}b$ may be pre-computed.

In general, as the rating of the borrower deteriorates, the probability that the borrower will draw on the unfunded part of the loan increases. Conversely, as the rating of the borrower improves, it becomes more likely that the borrow will prepay on the funded part of the loan or cancel the loan.

For example, consider a borrower with rating BB+ rating at a particular value date. If the borrower's credit rating was A at the issue date, then the likelihood of a draw is higher than it would be had the rating not changed. In other words, the draw option is "in-the-money." On the other hand, the borrower's credit rating was BB− at the issue date, then the draw option is worth little, i.e., "out-of-the-money," and the expected draw is lower.

The rate of draw and the rate of prepayment are also a function of the type of loan in question. For example, revolvers tend to have a higher probability of a draw than their corresponding CP backstops under the same scenario since a draw on a CP mat impact the ability of a borrower to secure future credit.

Draw and prepayment generally are American options with the added complication that on exercise the loan does not terminate, i.e., they may be exercised multiple times until maturity. A borrower can draw on a revolver, prepay at a later date, and draw again in the future. The option exercise boundary is thus a non-absorbing one.

Figure 1:
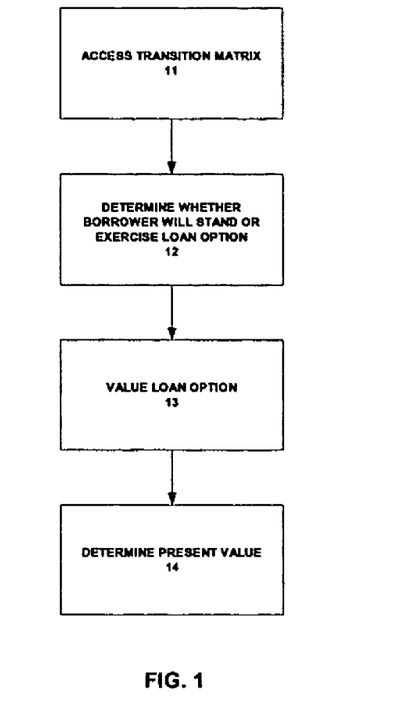
FIG. 1 illustrates a method according to one embodiment the present invention.

The operation of a loan option model (LOM) system will now be described. In particular, a processing method for operating on data representing parameters of a loan option model is illustrated in FIG. 1. The processing method 10 may be implemented by any suitable type of hardware (e.g., device, computer, computer system, equipment, component); software (e.g., program, application, instruction set, code); storage medium (e.g., disk, device, propagated signal); or combination thereof.

In one implementation, the method 10 involves accessing a transition matrix including probabilities for a borrower transitioning from one credit rating to another (step 11); determining for each credit rating whether a borrower will stand or exercise a loan option (step 12); valuing the loan option (step 13); and determining a present value of the instrument (step 14). The transition matrix may be calibrated to current market conditions based on arbitrage-free, risk neutral prices. Examples of loan options include options to prepay, draw, cancel, and term-out. The loan option may be valued using a dynamic programming approach. The amount of prepayment or draw is determined. Ramp functions may be used to account for sub-optimal exercise of options.

In some cases, the loan may include a funded part paying a cash flow and an unfounded part on which fees or paid. A borrow may prepay or stand with respect to the funded part and may stand or draw with respect to the unfounded part. In some situations, a borrow may cancel the entire loan.

In one implementation, the method 10 values an American option locally, using backward induction given a fully calibrated risk-neutral Markov chain. The boundary conditions on the funded and unfinded parts are known at maturity for all possible ratings (e.g., AAA, AA, A, BBB, BB, B, CCC, CC, C and D). Ratings may be modified by using a plus (+) or minus (−) sign to indicate relative standing within a rating.

The loan option model also includes criterion for determining the action to stay, draw, cancel, on the unfunded part, or to stay, prepay or cancel, on the funded part is discussed below.

Dates:
$\mathfrak{C}$={k: $t_k$ is cash flow date}: Collection of time indices corresponding to cash flow dates.

$\mathfrak{D}$={k: $t_k$ is default (bankruptcy) date}: Collection of time indices corresponding to default dates.

$\mathfrak{T}$={k: $t_k$ is model date}: Collection of time indices corresponding to model dates $$\mathfrak{T} \overset{\Delta}{=} \mathfrak{C} \cup \mathfrak{D}.$$

($s_k$, $e_k$): the start (end) accrual dates corresponding to $t_k$ respectively.

Fees and spread:
  $FacFee_i$: Facility Fee when credit rating is i.
  $ComFee_i$: Commitment Fee when credit rating is i.
  $CanFee_i$: Cancellation Fee when credit rating is i.
  $DrawFee_i$: Draw Fee when credit rating is i.
  $PrePayFee_i$: PrePay Fee when credit rating is i.
  $X_i$: Libor spread at state i.
  $P_{ij}^k$: Probability that the credit state migrate from i to $t_k$ to j at $t_{k+1}$.

$$D_k = \frac{B(t_0, t_{k+1})}{B(t_0, t_k)}: \text{Discount factor from } t_k \text{ to } t_{k+1}$$

Draw and prepay rates:
  $\alpha_{i,k}^r$: Draw rate at time $t_k$ and (credit) state i in regime r.
  $\beta_{i,k}$: Prepayment rate at time $t_k$ and (credit) state i.

$$L_k = \left(\frac{B(t_0, s_k)}{B(t_0, e_k)} - 1\right) \frac{1}{\Delta t(s_k, e_k)}:$$

Forward rate determined at $s_k$ for ($s_k$, $e_k$).

$$q_{i,k}^p \overset{\Delta}{=} \begin{cases} p & \text{if } s_{k+1} = s_k \\ i & \text{otherwise} \end{cases}$$

$$I(k \in \mathfrak{C}) \overset{\Delta}{=} \begin{cases} 1 & \text{if } k \in \mathfrak{C} \\ 0 & \text{otherwise} \end{cases}$$

Figure 2:
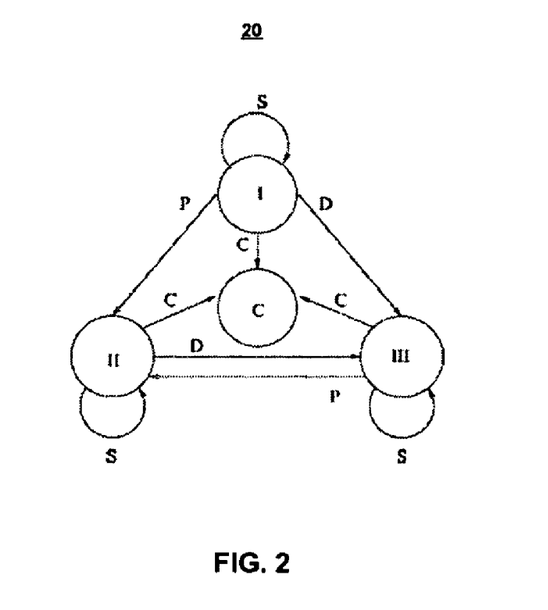
FIG. 2 illustrates a state machine according to one embodiment the present invention.

Referring to FIG. 2, one embodiment of the loan option model uses a state machine 20 to define three different regimes. The state machine 20 leads to one of three regimes depending on the action taken by the borrower at a given rating. In general, the procedure is followed at all time steps for all ratings until one arrives at the value date. Within each regime, the single exercise of the option is valued. Path dependencies may be avoided by restricting a draw to be followed by another draw, and a prepayment to be followed by another prepayment. This technique avoids multiple exercises and makes the process mathematically tractable (i.e., Markovian). The framework treats these features in a self-consistent manner using a dynamic programming algorithm and rolling back the tree in each regime simultaneously.

In one implementation, the definitions of the three different regimes are:

Regime I. Feasible actions: $A_k^I$={Stay, Cancel, Pre-pay, Draw} if $t_k$ is a cashflow date; $A_k^I$={Stay} otherwise.

Regime II. Feasible actions: $A_k^{II}$={Stay, Cancel, Pre-pay, Draw} if $t_k$ is a cashflow date; $A_k^{II}$={Stay} otherwise.

Regime III. Feasible actions: $A_k^{III}$={Stay, Cancel, Pre-pay, Draw} if $t_k$ is a cashflow date; $A_k^{III}$={Stay} otherwise.

In one embodiment, the loan option model performs dynamic programming as follows:

Let $$\mathfrak{R} \overset{\Delta}{=} \{I, II, III\}$$

be the pricing regimes, $$\mathfrak{G} \overset{\Delta}{=} \{AAA, AA, \cdots, D\}$$

be the credit states, $$\mathfrak{L} \overset{\Delta}{=} \{F, U\}$$

be funded (F) and unfunded (U) part of the loan, and $$\mathfrak{A} \overset{\Delta}{=} \{\text{Cancel, Pre-pay, Stay, Draw, Cancel}\}$$

be the action state. Furthermore, let $\mathfrak{A}^r$ represent the valid actions for each regime $r \in \mathfrak{R}$. We have
  $\mathfrak{A}^I$={Stay, Cancel, Pre-pay, Draw}
  $\mathfrak{A}^{II}$={Stay, Cancel, Draw}
  $\mathfrak{A}^{III}$={Stay, Cancel, Pre-pay}

Define $$V_{p,i}^{r,l}(t; a)$$

be the value function for unit notational at credit state i at time t with cash flow set at state p in the previous cash flow date, where $r \in \mathfrak{R}$, $l \in \mathfrak{L}$, p, i, $j \in \mathfrak{G}$ and $a \in \mathfrak{A}^r$ and $t \in \mathfrak{T}$. For example, $$V_{p,i}^{I,U}(t_k; \text{stay})$$

is the value function for credit state i at time $t_k$ with cash flow set at state p in the previous cash flow date if the action is to stay.

Denote, for each $r \in \mathfrak{R}$ and $l \in \mathfrak{L}$ $$V_{p,i}^{r,l}(t_k) \overset{\Delta}{=} \min_{a \in \mathfrak{A}^r} \{V_{p,i}^{r,l}(t_k; a)\}.$$

Each price formula $$V_{p,i,j}^{r,l}(t_k; a)$$

is listed below.

The pricing formulae for Regime I, Unfunded is:

| | State i | |
|---|---|---|
| $V_{p,i}^{I,U}(t_k; \text{cancel})$ | $(\text{ComFee}(k; p) + \text{FacFee}(k; p) + \text{CanFee})I(k \in \mathfrak{C})$ | |
| $V_{p,i}^{I,U}(t_k; \text{prepay})$ | Not Applicable | |
| $V_{p,i}^{I,U}(t_k; \text{stay})$ | $[\text{ComFee}(k; p) + \text{FacFee}(k; p)]I(k \in \mathfrak{C}) +$ $D_k \sum_j P_{ij}^k V_{q_{i,k}^p, j}^{I,U}(t_{k+1})$ | |
| $V_{p,i}^{I,U}(t_k; \text{draw})$ | $[\text{DrawFee} + \text{ComFee}(k; p) + \text{FacFee}(k; p) +$ $\alpha_{i,k}^I(-1 + D_k \sum_j P_{ij}^k V_{q_{i,k}^p, j}^{III,F}(t_{k+1})) +$ $(1 - \alpha_{i,k}^I)D_k \sum_j P_{ij}^k V_{q_{i,k}^p, j}^{III,U}(t_{k+1})]I(k \in \mathfrak{C})$ | |

The pricing formulae for Regime I, Funded is:

| | State (i) |
|---|---|
| $V_{p,i}^{I,f}(t_k; \text{cancel})$ | $[(L_k + X_p)(t_k - s_k) + \text{FacFee}(k; p) +$ $\text{CanFee} + 1]I(k \in \mathfrak{C})$ |
| $V_{p,i}^{I,f}(t_k; \text{prepay})$ | $[\text{PrePayFee} + \text{FacFee}(k; p) +](L_k + X_p)(t_k - s_k) +$ $\beta_{i,k}(1 + D_k \sum_j P_{ij}^k V_{q_{i,k}^p, j}^{II,F}(t_{k+1})) +$ $(1 - \beta_{i,k})D_k \sum_j P_{ij}^k V_{q_{i,k}^p, j}^{II,F}(t_{k+1})]I(k \in \mathfrak{C})$ |
| $V_{p,i}^{I,f}(t_k; \text{stay})$ | $[\text{FacFee}(k; p) + (L_k + X_p)(t_k - s_k)]I(k \in \mathfrak{C}) +$ $D_k \sum_j P_{ij}^k V_{q_{i,k}^p, j}^{I,F}(t_{k+1})$ |
| $V_{p,i}^{I,f}(t_k; \text{draw})$ | Not Applicable |

The pricing formulae for Regime II, Unfunded is:

| | State (i) |
|---|---|
| $V_{p,i}^{II,U}(t_k; \text{cancel})$ | $[\text{ComFee}(k; p) + \text{FacFee}(k; p) + \text{CanFee}]I(k \in \mathfrak{C})$ |
| $V_{p,i}^{II,U}(t_k; \text{stay})$ | $[\text{ComFee}(k; p) + \text{FacFee}(k; p)]I(k \in \mathfrak{C}) +$ $D_k \sum_j P_{ij}^k V_{q_{i,k}^p, j}^{II,U}(t_{k+1})$ |
| $V_{p,i}^{II,U}(t_k; \text{draw})$ | $[\text{DrawFee} + \text{ComFee}(k; p) + \text{FacFee}(t; p) +$ $(1 - \alpha_{i,k}^{II})D_k \sum_j P_{ij}^k V_{q_{i,k}^p, j}^{III,F}(t_{k+1}) +$ $\alpha_{i,k}^{II}\left(-1 + D_k \sum_j P_{ij}^k V_{q_{i,k}^p, j}^{III,F}(t_{k+1})\right)]I(k \in \mathfrak{C})$ |

The pricing formulae for Regime II, Funded is:

| | State (i) |
|---|---|
| $V_{p,i}^{II,F}(t_k; \text{cancel})$ | $[(L_k + X_p)(t_k - s_k) + \text{FacFee}(k; p) +$ $\text{CanFee} + 1]I(k \in \mathfrak{C})$ |
| $V_{p,i}^{II,F}(t_k; \text{stay})$ | $((L_k + X_p)(t_k - s_k) + \text{FacFee}(k; p))I(k \in \mathfrak{C}) +$ $D_k \sum_j P_{ij}^k V_{q_{i,k}^p, j}^{II,F}(t_{k+1})$ |
| $V_{p,i}^{II,F}(t_k; \text{prepay})$ | Not Applicable |

The pricing formulae for Regime III, Unfunded is:

| | State (i) |
|---|---|
| $V_{p,i}^{III,U}(t_k; \text{cancel})$ | $[\text{ComFee}(k; p) + \text{FacFee}(k; p) + \text{CanFee}]I(k \in \mathfrak{C})$ |
| $V_{p,i}^{III,U}(t_k; \text{draw})$ | Not Applicable |
| $V_{p,i}^{III,U}(t_k; \text{stay})$ | $[\text{ComFee}(k; p) + \text{FacFee}(k; p)]I(k \in \mathfrak{C}) +$ $D_k \sum_j P_{ij}^k V_{q_{i,k}^p, j}^{III,U}(t_{k+1})$ |

The pricing formulae for Regime III, Funded is:

| | State (i) |
|---|---|
| $V_{p,i}^{III,F}(t_k; \text{cancel})$ | $[(L_k + X_p)(t_k - s_k) +$ $\text{FacFee}(k; p) + \text{CanFee} + 1]I(k \in \mathfrak{C})$ |
| $V_{p,i}^{III,F}(t_k; \text{prepay})$ | $[\text{PrePayFee} + \text{FacFee}(k; p) + (L_k + X_p)(t_k - s_k) +$ $(1 - \beta_{i,k})D_k \sum_j P_{ij}^k V_{q_{i,k}^p, j}^{II,F}(t_{k+1}) +$ $\beta_{i,k}\left(1 + D_k \sum_j P_{ij}^k V_{q_{i,k}^p, j}^{II,U}(t_{k+1})\right)]I(k \in \mathfrak{C})$ |
| $V_{p,i}^{III,F}(t_k; \text{stay})$ | $[(L_k + X_p)(t_k - s_k) + \text{FacFee}(k; p)]I(k \in \mathfrak{C}) +$ $D_k \sum_j P_{ij}^k V_{q_{i,k}^p, j}^{III,F}(t_{k+1})$ |

For each regime $r \in \mathfrak{R}$, given $l \in \mathfrak{L}$, a dynamic programming algorithm is to compute $$V_{p,i}^{r,l}(t_k)$$

from k=N to k=o, $t_N$ being the loan maturity date. Each dynamical programming routine computes the value on a grid (p,i,k). Therefore, the state machine 20 is used to evolve six trees simultaneously—two each ($l \in \{F,U\}$) for three regimes ($r \in \{I, II, III\}$).

In one embodiment, the loan option model determines the prices of a loan as follows:

Let $x_0 \in \mathfrak{A}$ be the initial state, and $y_0$ be the credit state in the cash flow date just prior to the value date. Define $$V^{r,l} \triangleq V_{y_0, x_0}^{r,l}(t_0)$$

Then $V^{r,I}$ is the value of the loan at time $t_0$ in regime r. There are six such different values: $V^{I,U}$, $V^{II,U}$, $V^{III,U}$, $V^{I,F}$, $V^{II,F}$, $V^{III,F}$. Let F be the current funded amount and U be the current unfunded amount, the price of the loan PV is given by $$PV = FV^{I,F} + UV^{I,U}$$

In general, it is assumed that the loan starts from Regime I.

In one embodiment, the loan option model determines survival probabilities as follows:

Let $\Lambda$ be the generator for the finite state Markov chain estimated from historical data. The transition probability matrix, $P(t_0, t)$ is given by, $$P(t_0, t) = \exp\left(-\Lambda \int_{t_0}^{t} h(u) du\right)$$

where h(t) is the risk premium. The default swap market for investment grade credit or the bond market for non-investment grade credit is used to calibrate h(t).

If the initial state at time $t_0$ is i, then, the survival probability is given by $$p(t) = \sum_{j=1}^{n-1} P(t_0, t)_{i,j} = 1 - P(t_0, t)_{i,n}$$

In one embodiment, the loan option model determines boundary and terminal conditions as follows:

Boundary Condition:

$$V_{Default}^{i,U}(.) = -a_{i,k}^r (1 - R_L)$$

$$V_{Default}^{i,F}(.) = R_L$$

Terminal Condition at $T = t_K$:

$$V_{i,p}^{U}(T) = ComFee(K; p) + FacFee(K; p)$$

$$V_{i,p}^{F}(T) = 1 + (L_K + X_P)(T - S_K) + FacFee(K; p)$$

where, i is not the default state.

In one embodiment, the procedure includes modeling loans with an option to term-out. The term-out option gives the borrower the flexibility to draw on a CP until maturity and extend the maturity of the loan by a given period. Thus it is an extension option which transforms a CP of a given maturity into a term loan with an extended maturity. Term-outs can be valued within the same framework of the option model by adjusting the terminal condition.

For all ratings at contractual maturity, a price is determined for a floating rate bond paying libor plus spread. This generally is a good approximation because at ratings where the term-out option is in-the-money, the prepayment option is out-of-the-money. Let the forward value of floating rate bond paying libor plus spread be given by $PV_{bond}(i, T, T+\Delta T)$, where, i is the rating ($\neq$ Default), and $\Delta T$ is the term-out period. Then the terminal conditions at $T = t_K$ may be written as follows:

$$V_{i,p}^{U}(T) =$$
$$ComFee(K; p) + FacFee(K; p) + \min(0, -1 + PV_{bond}(i, T, T + \Delta T))$$

$$V_{i,p}^{F}(T) = (L_K + X_P)(T - S_K) + FacFee(K; p) +$$
$$\min(1, PV_{bond}(i, T, T + \Delta T))$$

where, i is not the default state.

In one embodiment, the procedure includes model parameters for draw and prepayment.

It may be assumed that prepayment is to be in full, i.e., $$\beta_{i,k}^{r} = 1$$

In some cases prepayment may be coupled with cancellation.

In embodiment, the procedure evaluates the impact of a draw prior to default by the borrower when the draw is done in full. Consider an unfunded CP Backstop. On issuing the loan, the lender hedges default risk by buying a market default swap for which there is no upfront cost. The loan option model defines, $\eta$ to be the loan loss to bond loss ratio, $S(t_0, T)$ to be the default swap premium that the lender pays in order to hedge his loan position, X to be the LIBOR spread the borrower pays on the drawn part, and c to be the commitment fee on the loan.

The following focuses on the case when the borrower draws on the CP prior to default. The net cash flow stream for the lender are:

$$c - \eta S(t_0, T), \ldots, c - \eta S(t_0, T) - 1, r + X - \eta S(t_0, T), r + X - \eta S$$
$$(t_0, T), \ldots, 0 + r + X - \eta S(t_0, T)$$

under no default and under default. Since the dollar in principal lent is guaranteed, the libor coupons with the principal, present value to unity on the date of the draw. Thus the net cash flows are:

$$c - \eta S(t_0, T), \ldots, c - \eta S(t_0, T), X - \eta S(t_0, T), X - \eta S(t_0, T), \ldots, X - \eta S(t_0, T)$$

Since almost for all cases, X>c, it can be inferred that the lender will always benefit from a draw prior to default since the lender is fully hedged and post-draw will receive higher fees. In other words, a draw in full prior to default is not optimal for the borrower.

In a slightly more general case, regime dependent draw rates are not necessarily equal to unity as described above. Considering once again the decision to draw on a CP backstop, regimes I and III (see FIG. 2), the notation for this exposition is as follows:

$$\alpha_{t,b}^{I} = \begin{cases} \alpha^{I} = const. & i = Default \\ \gamma^{P} = const. & otherwise \end{cases}$$

$$\alpha_{i,k}^{III} = \begin{cases} \alpha^{III} = const. & i = Default \\ \gamma^{PII} = 0 & otherwise \end{cases}$$

Under the guidelines of the model, the decision to draw is made when the following inequality holds:

$$\gamma^{I}(-1 + PV_{bond}^{III}) + (1 - \gamma^{I}) PV_{DS}^{III} < PV_{DS}^{I}$$

where:

$$PV_{bond}^{III} = \sum (L_j + X)B_j Pr(\tau > t_j) + B_N Pr(\tau > t_N) + R_L \int_{t_0}^{T} B_u dA(u)$$

$$PV_{DS}^{III} = c\sum B_j Pr(\tau > t_j) - \alpha_D^{III}(1-R_L)\int_{t_0}^{T} B_u dA(u)$$

$$PV_{DS}^{I} = c\sum B_j Pr(\tau > t_j) - \alpha_D^{I}(1-R_L)\int_{t_0}^{T} B_u dA(u)$$

The borrower should draw prior to default if, $$(X-c) - \eta S(t_0, T)\frac{1}{\gamma^I}(\gamma^I - \alpha_D^I + \alpha_D^{III}(1-\gamma^I)) < 0$$

In this example, $\gamma^I = \alpha_D^I = 1$ reduces the equation above to (X–c)<0. Thus, a draw is never optimal for the borrower.

With respect to exposure, the example of an undrawn CP Backstop in regime I is continued. Using the same notation introduced above, the exposure to default is $\alpha_D^I$ when the loan is not drawn. When drawn the exposure is $\gamma^I$. Under default the exposure increases by $\alpha_D^{III}(1-\gamma^I)$. Thus, $$\delta(t;\alpha_D^I,\gamma^I,\alpha_D^{III}) = \alpha_D^I(1-P_{drawn}(t;\alpha_D^I,\alpha_D^{III}))P_{dflt}(\Delta t) + P_{drawn}(t;\alpha_D^I,\gamma^I,\alpha_D^{III})\{\gamma^I(1-P_{dflt}(\Delta t))+(\gamma^I+\alpha_3(1-\gamma^I))P_{dflt}(\Delta t)\}$$

which simplifies to, $$\delta(t;\alpha_D^I,\gamma^I,\alpha_D^{III}) = \alpha_D^I P_{dflt}(\Delta t) + P_{drawn}(t;\alpha_D^I,\gamma^I,\alpha_D^{III})\{\gamma^I + (\alpha_D^{III}(1-\gamma^I)-\alpha_D^I)P_{dflt}(\Delta t)\}$$

On prepay, the state machine leads the process to regime II. In regime II, the loan is a fully unfunded facility since full prepay is assumed. Thus by construction, $$\alpha_D^{II} = \alpha_D^I$$

$$\gamma^{II} = \gamma^I$$

In one case, $S_i(t,T)$ is defined as the implied default swap spread for rating i for the period (T–t).

Case 1:

$$\alpha_D^I = \gamma^I (= \alpha_{hazard})$$

$$\alpha_D^{III} = 0$$

Exposure:

$$\delta(t;\alpha_D^I) = \alpha_D^I P_{dflt}(\Delta t) + P_{drawn}(t;\alpha_D^I,\alpha_D^I(1-P_{dflt}(\Delta t)))$$

Optimal Draw Decision:

$$(X-c)<0$$

This set of parameters leads to no conditions where draw favorable to the borrower. Imposing a sub-optimal draw will lead to an increase in present value.

Case 2:

In another case, default exposure is maintained while attempting to create economic benefit for the lender to draw. To that end, the following is proposed:

$$\alpha_D^I = \gamma^I (= \alpha_{hazard})$$

$$\alpha_D^{III} << \alpha_D^I$$

Such a scenario may be realistic for below investment grade names.

Exposure:

$$\delta(t;\alpha_D^I,\alpha_3) = \alpha_D^I P_{dflt}(\Delta t) + P_{drawn}(t;\alpha_D^I,\alpha_3)\{\alpha_D^I + (\alpha_3(1-\alpha_D^I)-\alpha_D^I)P_{dflt}(\Delta t)\}$$

Optimal Draw Decision:

$$(X-c)-\eta S_i(t,T)\frac{\alpha_D^{III}}{\alpha_D^I}(1-\alpha_D^I) < 0$$

Therefore, the decision to draw advances further out in rating space with decreasing $\alpha_D^{III}$ and in the limit a $\alpha_D^{III} \downarrow 0$, draw is never optimal. Also, when $\alpha_D^I = 1$, draw is never optimal. As an example consider $\alpha_D^{III} = 0.25$ and let $\alpha_D^I = 0.8$. The above equations reduce to, $$\delta(t;0.8,0.25) = 0.8 P_{dflt}(\Delta t) + P_{drawn}(t;0.8,0.2)\{0.8 - 0.75 P_{dflt}(\Delta t)\}$$

In this case, the exposure is bounded between [0.8, 0.85].

Case 3:

In another case, since the option model allows draws prior to default, the unfunded piece may be viewed as an annuity which pays commitment prior to a draw. Thus, the following is chosen:

$$\alpha_D^I \alpha_D^{III} = 0$$

$$\gamma^I = \alpha_{hazard}$$

Exposure:

$$\delta(t;\gamma^I) = P_{drawn}(t;\gamma^I)\gamma^I$$

Optimal Draw Decision:

$$(S-c)-\eta S_i(t,T)<0$$

These set of parameters imply that draw is optimal when the implied default swap spreads are greater than the interest spread.

The selection of the draw parameters may be influenced by the fact that the desk wanted to maintain the exposure dictated by the hazard rate model. Other financial factors such as curtailing additional draw on default, once a draw has been made ($\alpha_D^{III}$), led to adopting the parameters defined in case 1.

It can be shown that under the hazard rate model, the loan mark is approximately given by, $$M \equiv \frac{u+P}{c}$$

$$\approx 1 + y(X+f-\eta S(t,T))(T-t) + (1-y)(f+c-\alpha_d \eta S(t,T))(T-t)$$

where, $y=(f+\alpha_s u)/c$ and the other symbols have their usual meanings. It is clear from the above equation that the effect of the scaled draw rate ($\alpha_s$) is to increase the mark and hence the present value of the loan.

In the loan option model, CPs may be drawn sub-optimally thereby increasing their present value. Thus, the option model is in effect replacing the scaled draw rate with a dynamically calculated quantity. As the curve is shifted up by a basis point, the probability of downgrades increase, which makes draws (keeping the ramp parameters unchanged) more likely than in the base case. The net effect is equivalent to using a model with a higher implied expected draw rate.

In the hazard rate model, the present value calculation is done keeping the scaled draw rate constant. This explains why the present value for CPs is lower in the option model than in the hazard rate model. For term loans and term-outs the present value increases due to the positive convexity associated with prepayment. It is noted that this not the case for draws.

Credit migrations imply a spread process from which one can in principle compute volatility. Adding volatility to this model is a straight forward exercise by way of incorporating it in the generator of the Markov chain. This has the effect of increasing or decreasing the transition probabilities. Thus, the following can be written:

$$P(t,T) = e^{\sigma \wedge \int_t^T h(s) ds}$$

where σ, is spread volatility. By introducing σ, certain constraints on the generator may need to be satisfied.

Figure 3:
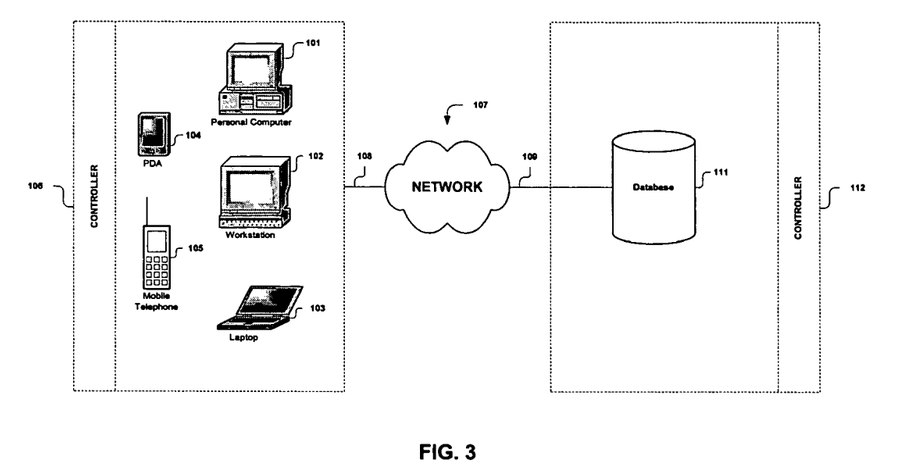
FIG. 3 illustrates a system according to one embodiment the present invention.

FIG. 3 illustrates one embodiment of a communications system in which aspects of the present invention may be used. In general, the communications system may be configured to generate, process, and maintain data for a loan option model.

As shown, the communications system includes a client system 100 for presenting information to and receiving information from a user. The client system 100 may include one or more client devices such as, for example, a personal computer (PC) 101, a workstation 102, a laptop computer 103, a network-enabled personal digital assistant (PDA) 104, and a network-enabled telephone 105. Other examples of a client device include, but are not limited to a server, a microprocessor, an integrated circuit, or any other component, machine, tool, equipment, or some combination thereof capable of responding to and executing instructions.

In one implementation, the client system 100 operates under the command of a client controller 106. The broken lines are intended to indicate that in some implementations, the client controller 106, or portions thereof considered collectively, may instruct one or more elements of the client system 100 to operate as described. Examples of a client controller 106 include, but are not limited to a computer program, a software application, computer code, set of instructions, plug-in, applet, microprocessor, virtual machine, device, or combination thereof, for independently or collectively instructing one or more computing devices to interact and operate as programmed.

The client controller 106 may be implemented utilizing any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The client controller 106 (e.g., software application, computer program) may be stored on a computer-readable medium (e.g., disk, device, and/or propagated signal) such that when a computer reads the medium, the functions described herein are performed.

In general, the client system 100 may be connected through a network 107 having wired or wireless data pathways 108, 109 to host system 110. The network 107 may include any type of delivery system including, but not limited to a local area network (e.g., Ethernet), a wide area network (e.g. the Internet and/or World Wide Web), a telephone network (e.g., analog, digital, wired, wireless, PSTN, ISDN, and/or XDSL), a packet-switched network, a radio network, a television network, a cable network, a satellite network, and/or any other wired or wireless communications network configured to carry data. The network 107 may include elements, such as, for example, intermediate nodes, proxy servers, routers, switches, and adapters configured to direct and/or deliver data.

In general, the client system 100 and the host system 110 each include hardware and/or software components for communicating with the network 107 and with each other. The client system 101 and host system 110 may be structured and arranged to communicate through the network 107 using various communication protocols (e.g., HTTP, TCP/IP, UDP, WAP, WiFi, Bluetooth) and/or to operate within or in concert with one or more other communications systems.

In one implementation, the host system 110 operates under the command of a host controller 112. The broken lines are intended to indicate that in some implementations, the host controller 112, or portions thereof considered collectively, may instruct one or more elements of host system 110 to operate as described. Examples of a host controller 112 include, but are not limited to a computer program, a software application, computer code, set of instructions, plug-in, microprocessor, virtual machine, device, or combination thereof, for independently or collectively instructing one or more computing devices to interact and operate as programmed.

In general, host controller 112 may utilize any suitable algorithms, computing language (e.g., C, C++, Java, JavaScript, Visual Basic, VBScript, Delphi), and/or object-oriented techniques and may be embodied permanently or temporarily in any type of computer, computer system, device, machine, component, physical or virtual equipment, storage medium, or propagated signal capable of delivering instructions. The host controller 112 when implemented as software or a computer program, for example, may be stored on a computer-readable medium (e.g., device, disk, or propagated signal) such that when a computer reads the medium, the functions described herein are performed.

The host system 110 generally provides a set of resources for a group of users. As shown, the host system 110 may include a database 111 existing on one or more servers (e.g., IBM® OS/390 operating system servers, Linux operating system-based servers, Windows NT™ servers) within the host system 110.

Figure 4:
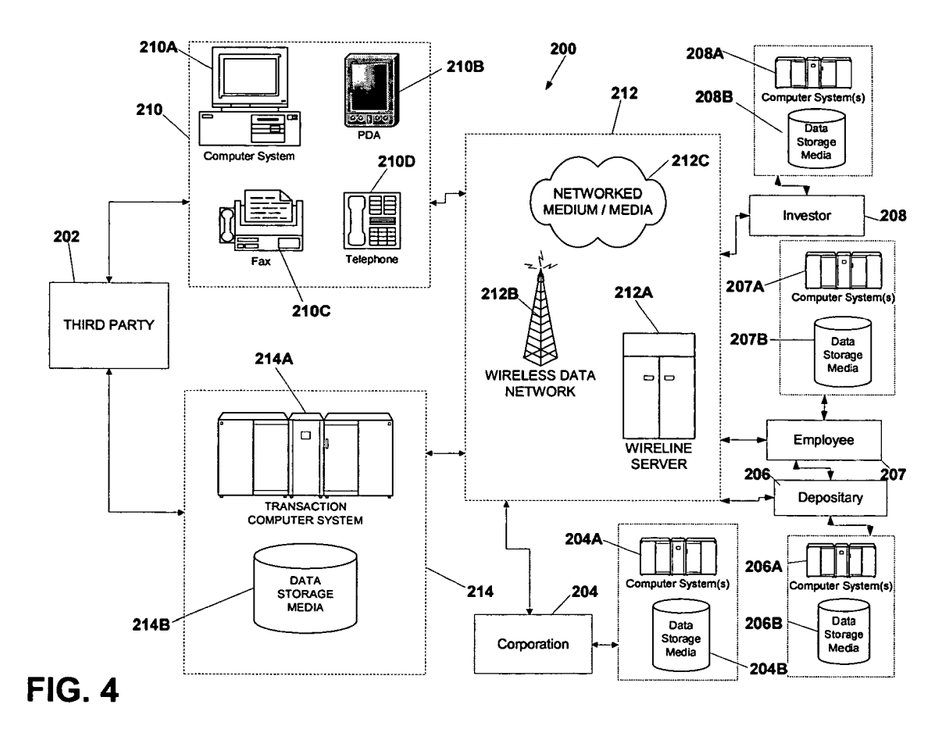
FIG. 4 illustrates a system according to one embodiment of the present invention.

FIG. 4 is a diagram illustrating one embodiment of a system 200 in which aspects of the present invention may be used. As shown, a third party 202 such as, for example, an underwriter, an investment bank, or an entity can communicate and/or exchange data with one or more of a corporation 204, a depository 206 (e.g. The Depository Trust Company), an employee 207 and/or an investor 208.

In one implementation, the depository 206 may assign a unique identification such as a Committee Uniform Securities Identification Procedures (CUSIP) number, for example, to each security approved for trading. The CUSIP number may be used to track buy and sell orders for the units during issue and/or remarketing.

In one aspect, the third party 202 can be operatively associated with one or more communications devices 210 such as, for example and without limitation, a computer system 210A, a personal digital assistant 210B, a fax machine 210C, and/or a telephone 210D (e.g. a wireline telephone, a wireless telephone, a pager, and the like), and/or other like communication devices.

The communication devices 210 may permit the third party 202, the corporation 204, the depository 206, the employee 207 and/or the investor 208 to communicate between/among each other through one or more communication media 212, such as by use of electronic mail communication through one or more computer systems, for example. The communication media 212 can include, for example and without limitation, wireline communication means such as a wireline server 212A, a wireless data network 212B, and/or a connection through a networked medium or media 212C (e.g., the Internet). In addition, the third party 202 (as well as any one or more of the corporation 204, the depositary 206, the employee 207 and/or the investor 208) can be operatively associated with one or more data processing/storage devices 214.

As illustrated in FIG. 2, the third party 202 can be operatively associated with a transaction computer system 214A, for example, and/or one or more data storage media 214B that can receive, store, analyze and/or otherwise process data and other information in association with communications that occur between/among the third party 202, the corporation 204, the depositary 206, the employee 207 and/or the investor 208.

In another aspect, the corporation 204 can be operatively associated with one or more computer systems 204A and/or one or more data storage media 204B. In another aspect, the depositary 206 can be operatively associated with one or more computer systems 206A and/or one or more data storage media 206B. In another aspect, the employee 207 can be operatively associated with one or more computer systems 207A and/or one or more data storage media 207B.

In another aspect, the investor 208 can be operatively associated with one or more computer systems 208A and/or one or more data storage media 208B. It can be appreciated that one or more of the computer systems (e.g., 204A, 206A, 207A, 208A, 214A) and one or more of the data storage media (e.g., 204B, 206B, 207B, 208B, 214B) can be employed to communicate, store, analyze, and/or otherwise process data related to financial transactions occurring between and/or among the third party 202, the corporation 204, the depositary 206, the employee 207 and/or the investor 208.

In one implementation, one or more elements of the system 200 may function as an agent for issuing a convertible security to a holder. In one embodiment, the system 200 may be configured to store and modify the securities. For example, data entries within the system may expire or convert at a certain time.

The benefits of the present methods, systems and computer-readable media are readily apparent to those skilled in the art. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves. The various portions and components of various embodiments of the present invention can be implemented in computer software code using, for example, Visual Basic, C, or C++ computer languages using, for example, object-oriented techniques.

Figure 6:
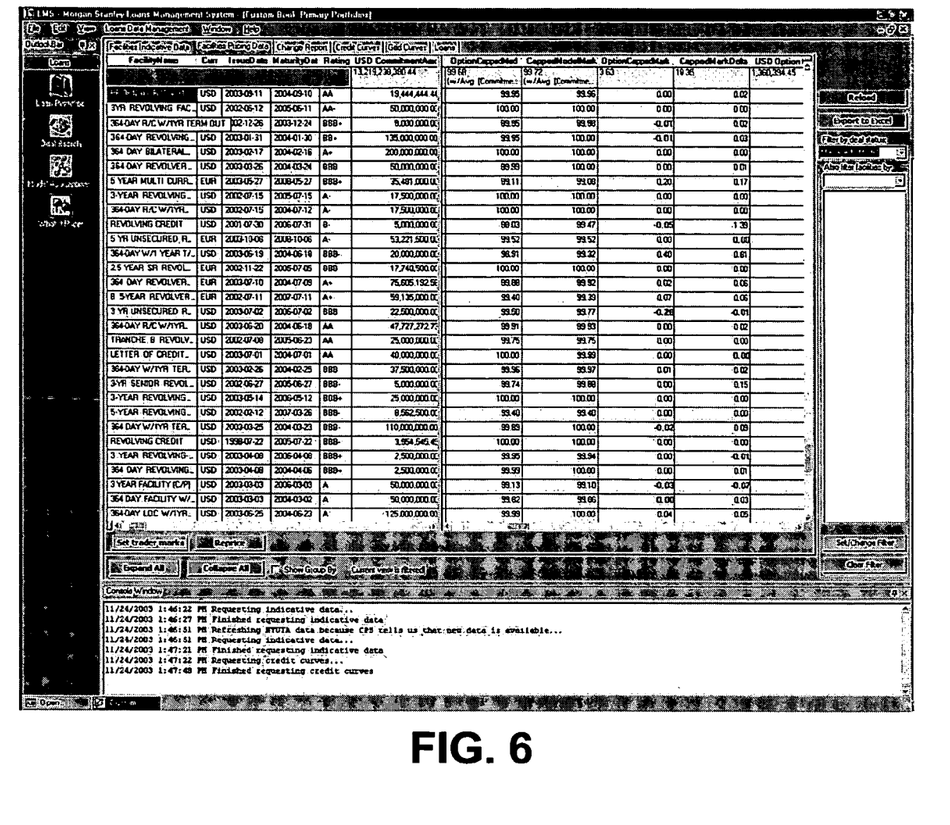

FIGS. 5 and 6 depict one embodiment of a graphical user interfaces (GUIs) that may be presented to a user. In general, the GUIs may be presented through an interactive computer screen to solicit information from and present information to a user in conjunction with the loan option model method. In one implementation, the UIs may be presented through a personal computer running a browser application and having various input/output devices (e.g., keyboard, mouse, touch screen, etc.) for receiving user input.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A computer-implemented method for operating on data to value a loan to a borrower, where the loan has an option, the method comprising:

determining, by a computer system, the probability of the borrower transitioning from one credit rating to another based on a Markov chain transition matrix of rating transition probabilities that is calibrated to current market conditions based on a relevant credit curve selected based on the credit rating of the borrower, wherein the computer system comprises one or more computers that comprise a processor and a computer memory;

valuing the loan option, by the computer system, wherein valuing the loan option comprises determining for each credit rating whether the borrower will stand or exercise the loan option based on a state machine; and determining, by the computer system, a present value of the loan based on the value of the loan option, wherein:

a first state of the state machine corresponds to a regime where the valid actions of the borrower with respect to the loan option comprise staying the loan, canceling the loan, prepaying the loan, and drawing upon the loan;

a second state of the state machine corresponds to a regime where the valid actions of the borrower with respect to the loan option comprise staying the loan, canceling the loan, and drawing upon the loan; and a third state of the state machine corresponds to a regime where the valid actions of the borrower with respect to the loan option comprise staying the loan, canceling the loan, and prepaying the loan, the first state leads to the second state when the borrower's action is to pre-pay the loan when in the first state;

the first state leads to the third state when the borrower's action is to draw on the loan when in the first state;

the second state leads to the third state when the borrower's action is to draw on the loan when in the second state; and the third state leads to the second state when the borrower's action is to pre-pay the loan when in the third state; and wherein the computer system determines the present value of the loan based on a sum of a value for a funded part of the loan and a value for an unfunded part of the loan, wherein the values for the funded part and unfunded part of the loan are determined based on the state of the state machine.

2. The method of claim 1, wherein the loan comprises a loan selected from the group consisting of a commercial paper (CP) backstop, a term loan, a revolver, and a CP backstop with a term-out option.

3. The method of claim 1, wherein the probabilities of the transition matrix are based on risk neutral migration probabilities.

4. The method of claim 3, wherein the risk neutral migration probabilities comprise default swap market risk neutral migration probabilities.

5. The method of claim 1, wherein determining whether the borrower will stand or exercise the loan option is based on the borrower's credit rating and the loan type.

6. The method of claim 1, wherein determining whether the borrower will stand or exercise the loan option is made with respect to the funded part of the loan.

7. The method of claim 1, wherein determining whether the borrower will stand or exercise a loan option is made with respect to the unfunded part of the loan.

8. The method of claim 1, wherein the loan option is an option selected from the group consisting of an option to prepay, an option to draw, an option to cancel, and an option to term out.

9. The method of claim 1, wherein valuing the loan option comprises calculating a prepayment amount.

10. The method of claim 1, wherein valuing the loan option comprises calculating a draw amount.

11. The method of claim 1, wherein valuing the loan option comprises using ramp functions to account for sub-optimal exercise of options.

12. The method of claim 1, wherein the transition matrix is calibrated based on arbitrage free prices.

13. A computer-based system for determining a present value of a loan to a borrower, where the loan has an option, the system comprising:
a database for storing the present value of the loan; and
a controller in communication with the database for determining a present value of the loan by determining the probability of the borrower transitioning from one credit rating to another based on a Markov chain transition matrix of rating transition probabilities that is calibrated to current market conditions based on a relevant credit selected based on the credit rating of the borrower, determining for each credit rating whether the borrower will stand or exercise the loan option based on a state machine, and valuing the loan option, wherein:
a first state of the state machine corresponds to a regime where the valid actions of the borrower with respect to the loan option comprise of staying the loan, canceling the loan, prepaying the loan, and drawing upon the loan;
a second state of the state machine corresponds to a regime where the valid actions of the borrower with respect to the loan option comprise of staying the loan, canceling the loan, and drawing upon the loan;
a third state of the state machine corresponds to a regime where the valid actions of the borrower with respect to the loan option comprise staying the loan, canceling the loan, and prepaying the loan;
the first state leads to the second state when the borrower's action is to pre-pay the loan when in the first state;
the first state leads to the third state when the borrower's action is to draw on the loan when in the first state;
the second state leads to the third state when the borrower's action is to draw on the loan when in the second state; and
the third state leads to the second state when the borrower's action is to pre-pay the loan when in the third state; and
the present value of the loan is determined based on a sum of a value for a funded part of the loan and a value for an unfunded part of the loan, wherein the values for the funded part and unfunded part of the loan are determined based on the state of the state machine.

14. The system of claim 13, wherein the loan comprises a loan selected from the group consisting of a commercial paper (CP) backstop, a term loan, a revolver, and a CP backstop with a term-out option.

15. The system of claim 13, wherein the probabilities of the transition matrix are based on risk neutral migration probabilities.

16. The system of claim 15, wherein the risk neutral migration probabilities comprise default swap market risk neutral migration probabilities.

17. The system of claim 13, wherein determining whether the borrower will stand or exercise the loan option is based on the borrower's credit rating and the loan type.

18. The system of claim 13, wherein determining whether the borrower will stand or exercise the loan option is made with respect to the funded part of the loan.

19. The system of claim 13, wherein determining whether the borrower will stand or exercise the loan option is made with respect to the unfunded part of the loan.

20. The system of claim 13, wherein the loan option comprises an option selected from the group consisting of an option to prepay, an option to draw, an option to cancel, and an option to term out.

21. The system of claim 13, wherein valuing the loan option comprises calculating a prepayment amount.

22. The system of claim 13, wherein valuing the loan option comprises calculating a draw amount.

23. The system of claim 13, wherein valuing the loan option comprises using ramp functions to account for sub-optimal exercise of options.

24. The method of claim 3, wherein the risk neutral migration probabilities comprise bond market risk neutral migration probabilities.

25. The system of claim 15, wherein the risk neutral migration comprise bond market risk neutral migration probabilities.

* * * * *